United States Patent [19]

Tai et al.

[11] Patent Number: 4,815,039
[45] Date of Patent: Mar. 21, 1989

[54] FAST REAL-TIME ARBITER

[75] Inventors: Jy-Der Tai, Plano; Edison Chiu, Richardson, both of Tex.

[73] Assignee: Texas Instruments Incorporated, Dallas, Tex.

[21] Appl. No.: 142,388

[22] Filed: Jan. 11, 1988

[51] Int. Cl.⁴ .............................................. G11C 13/00
[52] U.S. Cl. .................................... 365/189; 365/221; 365/233; 307/269
[58] Field of Search ............... 365/182, 189, 230, 201, 365/207, 208, 210, 233, 221; 307/269; 377/64

[56] References Cited

U.S. PATENT DOCUMENTS 4,680,701 7/1987 Cochran ............................. 365/233

Primary Examiner—Terrell W. Fears
Attorney, Agent, or Firm—Thomas R. FitzGerald; Leo N. Heiting; Melvin Sharp

[57] ABSTRACT

An arbiter (52) is operable to supply an up/down signal (11) and a clock signal (13) to an up/down counter (10) so that the up/down counter (10) can count the difference between read requests (54) and write requests (56) experienced by an associated FIFO memory.

The arbiter (52) is operable to receive asynchronous read and write requests (54, 56) that are closely spaced in time or appear simultaneously, and to store the read request in a read latch (104) and the write request in a write latch (92). A decision circuit (62) is operable to determine priority between the read and write requests, and processes the request that is awarded priority. Once the first priority request has been processed, the stored second non-priority request is then processed.

20 Claims, 2 Drawing Sheets

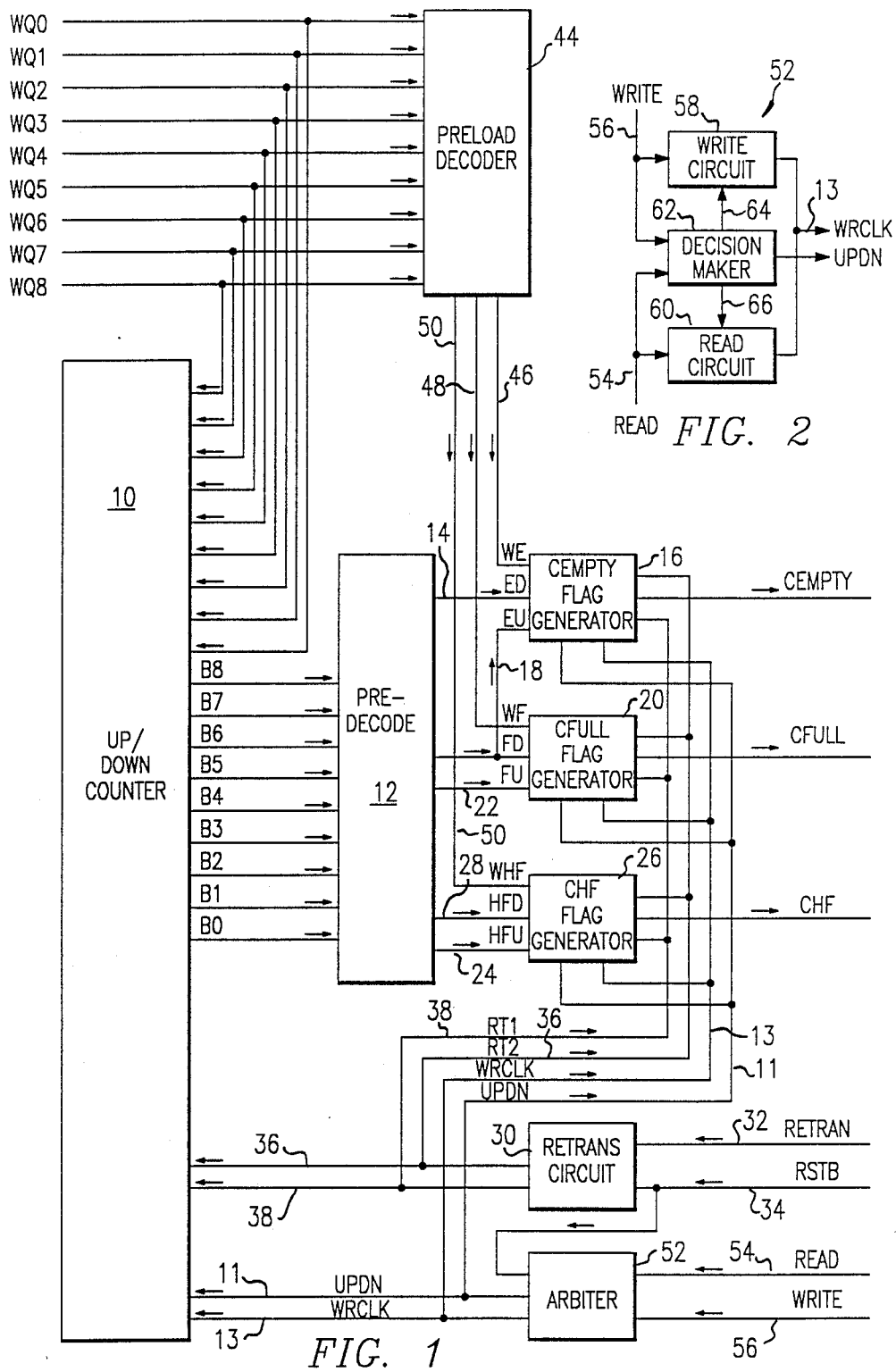

FAST REAL-TIME ARBITER

TECHNICAL FIELD OF THE INVENTION

This invention relates in general to first-in, first-out (FIFO) memories, and in particular concerns an arbiter and method for assigning priority to read and write requests relating to FIFO memories.

BACKGROUND OF THE INVENTION

First-in, first-out (FIFO) memories are typically used to control data communication from a relatively fast electronic device, such as a microprocessor, to a relatively slower device such as a terminal. Typical FIFO memories have a plurality of cells arranged in rows and columns. A read counter is used to address a location in the memory to be read, and a write counter is used to point to a location into which data is to be written. The read counter is incremented to a next read location responsive to the receipt of a read request that originates from one of the deices to which it is connected. The write counter is incremented responsive to the receipt of a write request that originates from the other of the connected devices.

In a previously developed FIFO design, an up/down counter is used to count the difference between the number of read requests and write requests received by the read and write counters. These read and write requests are generated asynchronously. A problem has occurred in accurately recording the above-described difference when the write and read requests arrive closely or simultaneously in time. Without somehow regulating these requests, there is a danger that only one will be recorded and the other lost.

A need has therefore arisen for an arbiter between external read and write signals that will decide which of the signals is to be given priority while storing the other for use to actuate a subsequent operation.

SUMMARY OF THE INVENTION

According to one aspect of the invention, an arbiter receives read and write requests and selectively processes these requests for application to a sequential memory unit. The arbiter includes a read circuit for storing a read request and outputting a read signal responsive thereto. A write circuit is provided for storing a write request and to output a write signal responsive thereto. A decision circuit of the arbiter includes a read disabler for disabling the read circuit from outputting the read signal responsive to the decision circuit receiving the write request before the read request. The decision circuit further has a write disabler for disabling the write circuit from outputting a write signal responsive to the decision circuit receiving the read request before the write request. In the event that the read request and the write request are received closely or simultaneously in time, the first of the read and write requests is processed and the second of the write and read requests is processed only after the completion of the processing of the first of the requests.

According to another aspect of the invention, an arbiter is provided for determining the priority between a read request and a write request received closely in time. A read circuit of the arbiter receives a read request and is operable to store a read state and to generate a read clock pulse responsive thereto. A write circuit receives a write request and is operable to store a write state and to generate a write clock pulse responsive thereto. A decision circuit is provided that also receives the write request and the read request. A read disabler of the decision circuit disables the transmission of the read clock pulse responsive to the decision circuit receiving the write request before the read request. A write disabler disables the transmission of the write clock pulse responsive to the decision circuit receiving the read request before the write request. A read/write signal generator of the decision circuit generates a read signal in response to a read request and generates a write signal in response to a write request. The arbiter has two outputs. A read/write or UP/DOWN signal is coupled to the read/write signal generator, and outputs a first value corresponding to a read operation or a second value corresponding to a write operation. The second output is a clock output that generates a clock pulse responsive either to the read clock pulse output from the read circuit or the write clock pulse output from the write circuit.

A principal advantage of the invention is that read and write requests received nearly simultaneously will be preserved and processed such that both will be sensed by any device receiving the read/write signal and the clock signal. In the illustrated embodiment where the arbiter is used to supply the signals to an up/down counter, the up/down counter will therefore record both a write request and a read request. The up/down counter is therefore capable of keeping an accurate record of the difference between write and read requests so that memory capacity status flags may be generated at the appropriate points. Other advantages of the invention are conferred by the fact that the arbiter is relatively fast and does not depend upon a clock for its operation. The write/read signal and the clock signal may therefore be generated in real time.

BRIEF DESCRIPTION OF THE DRAWINGS

Further aspects of the invention and their advantages are described in the following detailed description in conjunction with the appended drawings, in which:

FIG. 1 is a schematic electrical block diagram of an up/down counter and flag generator circuit incorporating the arbiter of the invention;

FIG. 2 is a simplified schematic block diagram of the arbiter shown in FIG. 1.

DETAILED DESCRIPTION

FIFO Flag Generating Circuitry

Figure 3:
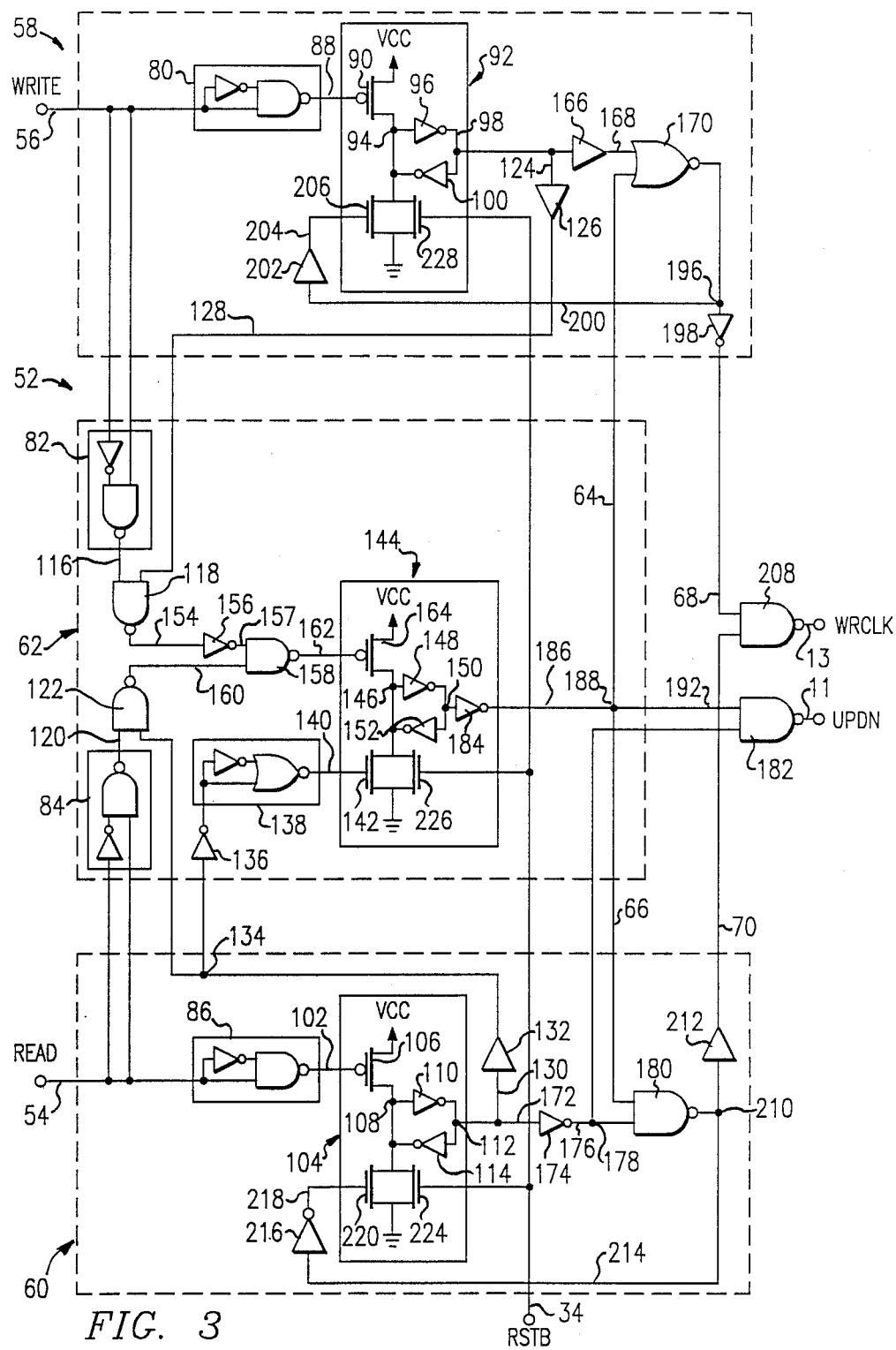
FIG. 3 is a detailed schematic electrical diagram of a preferred arbiter according to the invention.

FIG. 1 is a schematic block electrical diagram of internal flag-generating circuitry according to the invention. This internal flag generating circuitry includes an up/down counter 10 which receives as inputs a plurality of lines WQ0–WQ8 from a write counter (not shown). This write counter, which for example may be a 9-bit binary counter, determines the address location into which data will next be written within an associated FIFO memory (not shown). A read counter (not shown) is provided to determine the location in the FIFO memory from which data is to be read.

Up/down counter 10 records the difference between the read counter and the write counter responsive to signals on input lines 11 and 13. A bivalent signal is input on UPDN or read/write signal line 11 into up/down counter 10. In the illustrated embodiment, a high value of UPDN indicates a write request, and a low value thereof indicates a read request. Line 13 (WRCLK) supplies a clock pulse that indicates the present occurrence of either a write request or a read request, depending on the current value of line 11.

Up/down counter 10 is operable to output a multi-bit signal on lines B0–B8 that indicates how much capacity of the FIFO memory is being used. For example, where the FIFO memory is empty, the signals on lines B0–B8 will all be logic zeros.

Lines B0–B8 are output from up/down counter 10 to a predecoder 12 that is operable to decode each of a plurality of boundary values that are in turn used for the generation of a plurality of internal flags. In the illustrated embodiment, an "empty down" or ED signal is generated on a line 14 from predecoder 12 and is input into a CEMPTY flag generator 16. An "empty up" or EU signal is generated on an output line 18 and is input into CEMPTY flag generator 16 and also into a CFULL flag generator 20. A "full down" (FD) signal happens to be the same as EU or "empty up". A "full up" (FU) signal is output on a line 22 and is input into CFULL flag generator 20. A "half full up" (HFU) signal is output on a line 24 and is input into a CHF flag generator 26. Finally, a "half full down" (HFD) signal is output from predecoder 12 on a line 28 to CHF flag generator 26.

Each of the signals ED, EU, FU, HFD and HFU are generated responsive to a certain value appearing on input signals B0–B8. For example, the "ED" signal is generated responsive to lines B0–B8 inputting 000000010. This corresponds to the FIFO memory being in the condition EMPTY +2, or where only two cells in the memory contain data. A signal is output on EU line 18 when input lines B0–B8 input 000000000, corresponding to a completely EMPTY condition of the FIFO. The ED signal on line 14 and the EU on line 18 are input into flag generator 16 to generate a CEMPTY flag that will be generated when the FIFO memory is in an EMPTY +1 condition.

An FU signal is generated on output line 22 when B0–B8 input 111111110, indicating an ALMOST FULL −1 condition in the FIFO. Flag generator 20 generates the CFULL internal flag when the FIFO memory is 111111111, indicating an ALMOST FULL condition. Therefore, the other boundary condition used to generate this flag is an FD signal on line 18, corresponding to a completely FULL memory.

The HFD signal on line 28 goes high responsive to lines B0–B8 inputting 1000000001, corresponding to a HALF FULL +1 condition in the FIFO. The HFU signal on line 24 goes high responsive to B0–B8 inputting 011111111, corresponding to a HALF FULL −1 condition in the FIFO. The HFD and HFU boundary signals are used by flag generator 26 to generate the CHF flag when the memory is exactly HALF FULL.

UPDN line 11 and clock line 13 are connected to each of flag generators 16, 20 and 26. Flag generators 16, 20 and 26 each use the signals on these lines to set the respective flags on the CEMPTY, CHF and CFULL lines.

A retransmit circuit 30 receives a retransmit signal RETRAN on a line 32 and a master reset signal RSTB on line 34. Responsive to the receipt of a high RETRAN signal on line 32, retransmit circuit 30 will first generate a reset signal on an RT1 output line 38, and after a predetermined delay will generate a pulse on an RT2 output line 36. RT1 and RT2 lines 38 and 36 are connected to up/down counter 10, CHF flag generator 26, CFULL flag generator 20 and CEMPTY flag generator 16. Responsive to a high signal on master reset line 34, retransmit circuit 30 will only generate a high signal on RT1 line 38.

The RETRAN signal is sent into the FIFO from a connected reading device (not shown) so that the data just transmitted can be transmitted again. This can happen where the first transmission of the data was garbled or where it is desired to fetch the data several times in sequence. As above noted, up/down counter 10 is operable to store the difference between the write counter and the read counter, thus giving a measure of how full the FIFO memory is.

The RETRAN signal input on line 32 is also used to reset the read counter (not shown) to 0. After a RETRAN signal, the data will be read from the FIFO (not shown) from its 0 location sequentially upward until empty.

Up/down counter 10 increments or decrements according to the signals received on up/down input line 11 and read/write clock (WRCLK) input line 13. When WRCLK line 13 is high and the UPDN signal on line 11 is high, the up/down counter 10 will increment by 1. If the clock signal on WRCLK line 13 is high and the UPDN signal is low, the up/down counter will decrement by 1. In this manner, the difference between the write counter (not shown) and the read counter (not shown) is kept track of. The difference is stored in binary form in a plurality of flip flops (not shown) internal to up/down counter 10.

When the read counter is reset to zero responsive to a RETRAN signal, the actual difference between the value of the read counter and the value of the write counter will not be correctly represented in up/down counter 10. Therefore, responsive to a RETRAN signal, retransmit circuit 30 will generate a high pulse on an RT1 line 38. RT1 line 38 acts to reset each of the flip flops (not shown) within up/down counter 10 to zero. Shortly thereafter, a high pulse on an RT2 line 36 is generated by retransmit circuit 30. This high pulse on RT2 line 36 is transmitted to counter 10 to enable each flip flop therein to receive a corresponding bit value from a respective write control line WQn. Since the address represented on WQ0–WQ8 is the address registered in the write counter, and since at this time the read counter has been reset to 0, the write counter address is equal to the difference between the write counter address and the read counter address. Therefore, up/down counter 10 is able to continue to correctly keep track of the difference between the read counter and the write counter.

Write counter lines WQ0–WQ8 are also directly fed into a preload decoder 44. Preload decoder 44 has a WE output 46, a WF output 48, and a WHF output 50. WE will be high responsive to WQ0–WQ8 being 000000001. Line 46 is connected to CEMPTY flag generator 16, and a CEMPTY flag will be generated responsive to high signal on WE line 46 during a retransmit condition.

WF line 48 is connected to CFULL flag generator 20. Responsive to WQ0–WQ8 inputting 111111111 into preload decoder 44, the signal on WF line 48 will be high. This in turn actuates flag generator 20 to generate a CFULL flag during a retransmit condition.

WHF line 50 is connected to CHF flag generator 26. Responsive to WQ0–WQ8 inputting 100000000 into decoder 44, WHF line 50 will be high, actuating flag generator 26 to generate a CHF flag during a retransmit condition.

The Arbiter Circuit

As previously explained, up/down counter 10 increments or decrements responsive to signals on UPDN line 11 and read/write clock line 13. These lines in turn are outputs of an arbiter circuit 52. Arbiter circuit 52 receives as inputs a READ request line 54 and a WRITE request line 56. It also receives master reset line 34. As will be explained in more detail below, arbiter circuit 52 determines the priority between conflicting read and write request signals received on lines 54 and 56. After determining the priority between the read and write operations, it will generate a clock pulse on WRCLK line 13 and the appropriate value on UPDN line 11. If read and write requests are received on lines 54 and 56 at close to the same time, arbiter 52 will actuate up/down counter 10 to first increment and then decrement, or vice versa, sequentially.

Read/Write Request Arbiter

RT1 line 38 is input to each of flag generators 16, 20 and 26 and is used as a reset line. RT2 line 36 is input into generators 16, 20 and 26 and is used as a preload enable line.

The illustrated embodiment has an up/down counter 10 with nine bits B0-B8. It will be understood that the number of bits can be easily expanded or contracted without departing from the scope of the invention. Further, while three flag generators have been shown, less than these number of flags may be generated where the flags are not necessary, or other flags can be easily generated to represent any level of use of the FIFO capacity.

Referring now to FIG. 2, a simplified schematic diagram of arbiter 52 is shown. Arbiter 52 is comprised of three main logic blocks: a write circuit 58, a read circuit 60 and a decision-maker logic block 62. Functionally, write circuit 58 is a logic block which recognizes the occurrence of a write request on line 56 and stores a "write" state responsive thereto. Similarly, read circuit 60 operates to recognize a read request input on line 54 and store such a read signal. The decision-maker 62 detects the occurrence of both the read and write requests and is operable to assign the priority of execution of these requests.

As previously described in conjunction with FIG. 1, when arbiter 52 receives a write request on line 6, it will normally generate a high clock pulse at the WRCLK output 13 and also a high state on UPDN or read/write signal line 11. If a read request is received, arbiter 52 normally produces a positive clock pulse at the clock output 13 accompanied by a low value at UPDN output 11. When one request signal reaches arbiter 52 while the other is in processing, the signal that is the last to arrive has to wait until the completion of the first-to-arrive signal. When both a read request and a write request arrive almost at the same instant, decision-maker 62 decides the priority and allows only one input to actuate the generation of clock and UPDN outputs. Upon completion of the processing of the higher priority request, the other lower priority can start.

This is accomplished through a write disable output 64 that is output from decision-maker 62 to write circuit 58. Similarly, decision-maker block 62 outputs a read disable signal on line 66 to read circuit 60. Write circuit 58 is disabled through line 64 from outputting a write clock signal on its output 68 (FIG. 3), and read circuit 60 is disabled by a signal on line 66 from outputting a read clock on its output 70 (FIG. 3). The non-priority request is stored in circuit 58 or 60 until a disabling signal is no longer present on a respective line 64 or 66, at which time the non-priority request will actuate an appropriate clock signal from the circuit where it is stored.

Referring next to FIG. 3, a detailed electrical schematic diagram of a preferred embodiment of arbiter 52 is illustrated. The approximate boundaries of write circuit 58, decision-maker 62 and read circuit 60, as represented in FIG. 2, are respectively shown in FIG. 3 by the dashed line boxes 58, 62 and 60. A write request signal is input on line 56 to each of a pair of rising edge detectors 80 and 82. The output of edge detector 80 is used as an input to the remainder of write circuit 58, while the output of edge detector 82 is used as an input to the remainder of decision-maker block 62.

In other embodiments, a falling edge may be input on lines 56 and 54 to indicate respective WRITE and READ operations, in which case falling-edge detectors would be used.

Similarly, read request line 54 is input to an edge detector 84 and an edge detector 86. Each edge detector 80-86 is operable to detect a rising edge on write line 56 or read line 54. When such a rising edge is detected, each edge detector 80-86 is operable to output a negative pulse at its output.

Referring particularly to edge detector 80, and output line 88 thereof is connected to the gate of a p-channel transistor 90, which is a portion of a write latch indicated generally at 92. A negative pulse on line 88 is operable to connect a latch node 94 at the source of transistor 90 to VCC, thereby storing a logic "1" at node 94. Node 94 is connected to an input of an inverter 96, which in turn has an output connected to a write latch output node 98. Node 98 serves as an input to a second inverter 100 that has an output connected back to node 94. The pair of inverters 96 and 100 therefore serve as a latch that stores one state at node 94 and a second, opposite state at node 98. In the instance where node 94 stores a logic "1", node 98 stores a logic "0".

In the read circuit, rising edge detector 86 similarly has an output 102 that is connected to the input of a latch indicated generally at 104. Line 102 is connected to the gate of a P-channel transistor 106. The current path of P-channel transistor 106 can be actuated to connect VCC to a read latch node 108. Node 108 is connected through a first inverter 110 to a node 112. Node 112 is in turn connected to the input of a second inverter 114. The output of node 114 is connected back to node 108.

As to the second pair of edge detectors, rising edge detector 82 has an output 116 connected to a first input of a NAND gate 118. Rising edge detector 84 similarly has an output 120 that is connected to a first input of a NAND gate 122.

The output node 98 of write latch 92 is connected through a line 124 to the input of a delay gate 126. The output of delay gate 126 is connected through a line 128 to a second input of NAND gate 118. Similarly, the output node 112 of read latch 104 is connected through a line 130 to an input of a delay gate 132. The output of delay gate 132 is connected to a node 134, which in turn is connected to an input of an inverter 136. Node 134 is further connected to a second input of NAND gate 122.

The output of inverter 136 is connected to a falling-edge detector 138. Falling edge detector 138 has an output 140 that is connected to the gate of an n-channel reset transistor 142. N-channel transistor 142 is a portion of a read/write signal latch indicated generally at 144. Falling-edge detector 138 is operable to generate a positive pulse on its output 140. This in turn operates reset transistor 142 to connect a read/write latch node 146 to ground. Node 146 is connected to an input of a first inverter 148, which in turn has an output that is connected to a second read/write signal latch node 150. Node 150 is in turn connected to the input of an inverter 152 that has an output connected back to latch node 146. Nodes 146 and 150 will therefore store opposite states.

Serving as a WRITE request input of decision-making block 62, NAND gate 118 has an output 154 that is connected to the input of an inverter 156. The output of inverter 156 is connected by a line 157 to the input of a NAND gate 158. Serving as the READ request input of decision block 62, the output of NAND gate 122 is connected through a line 160 to a second input of NAND gate 158.

The output of NAND gate 158 is connected through line 162 to the gate of a p-channel transistor 164. A low state on line 162 will therefore cause transistor 164 to connect node 146 to VCC, thereby causing a high state to be stored at latch node 146 and a low state at latch node 150.

Output node 98 of write latch 92 is connected to the input of a delay gate 166. The output of delay gate 166 is connected through a line 168 to a first input of a disabling NOR gate 170. Somewhat similarly, output node 112 of read latch 104 is connected through a line 172 to an inverter 174. The output of inverter 174 is connected through a line 176 to a node 178. Node 178 is connected to a first input of a disabling NAND gate 180, and is further connected to a first input of an UPDN output NAND gate 182.

Inside read/write signal latch 144, latch node 150 is connected to the input of an inverter 184. The output of inverter 184 is in turn connected through a line 186 to a read/write signal node 188. Node 188 is connected through line 64 to a second input of disabling NOR gate 170, through line 66 to a second input of disabling NAND gate 180, and through line 192 to a second input of UPDN output NAND gate 182.

The output of write-disabling NOR gate 170 is connected to a write clock signal node 196. Node 196 is in turn connected to an input of an inverter 198, and further through a line 200 back to an input of a delay gate 202. The output of delay gate 202 is connected through a line 204 to the gate of an n-channel reset transistor 206. N-channel transistor 206 is operable to reset write latch node 94 to ground. In the other branch, the output of inverter 198 is connected by line 68 to a first input of a write/read clock output NAND gate 208.

The output of read disabling NAND gate 180 is connected to a read clock signal node 210, which in turn is connected to an input of a delay gate 212. The output of delay gate 212 is connected via read clock line 70 to a second input of write/read output NAND gate 208. Read clock signal node 210 is also connected through a line 214 back to the input of an inverter 216. Inverter 216 has an output connected through a line 218 to the gate of an n-channel reset transistor 220. N-channel transistor 220 is operable to reset read latch node 108 to ground upon the receipt of a high state on line 218.

Master reset line 34 is connected to the gate of an n-channel reset transistor 224 inside read latch 104, the gate of an n-channel reset transistor 226 in read/write signal latch 144, and to the gate of n-channel reset transistor 228 inside write latch 92. A high pulse on reset line 34 operates to reset each of latch nodes 108, 94 and 146 to ground.

In operation, suppose that a positive-going pulse is received on input write request line 56. Rising edge detector 80 will output a low pulse on line 88 responsive to sensing the positive transition on line 56. This in turn will cause a high state to be stored at write latch node 94, and therefore a zero state to exist at write latch output node 98.

Read latch 104 behaves in a similar manner to write latch 92. Responsive to a positive-going edge on read request line 54, rising edge detector 86 will output a negative pulse on output line 102, thereby causing latch node 108 to store a high state and latch node 112 to store a low state.

Read/write signal latch 144 behaves in a manner somewhat similar to write latch 92 and read latch 104. A high state at node 157, in combination with a high state on line 160, causes arbiter NAND gate 158 to output a low state on line 162. This low state causes a high state to be stored at latch node 146. A low state will therefore be stored at latch node 150. Unlike latches 92 and 104, the low state at node 150 is inverted through inverter 184, and is output as a high state at read/write signal node 188.

A low state at node 188 (the reset condition) enables NOR gate 170 through line 64 and disables NAND gate 180 through line 66. If there is a rising edge at the write request input 56, rising edge detector 80 will detect this transition and generate a negative pulse on line 88 to write latch 92. Write latch output node 98 will therefore be low. This low state will be propagated through line 124, delay gate 126 after a predetermined delay, and line 128 to the second input of NAND gate 118. Therefore, the node 157 will stay low. A low at node 157 disables arbiter NAND gate 158 and prevents any read request from interrupting a current write operation.

Simultaneously with this action, rising edge detector 82 detects the same transition of the write input 56 and sets its output 116 low. Since one input of NAND gate 118 is low, its output will be high at 154, and node 157 will be low. This happens before the other input 128 of NAND gate 118 goes low, and therefore speeds the acquisition by node 157 of a low state.

The output 116 of detector 82 will go high after a predetermined delay. The write request is however preserved by the appearance of a low state on node 128, which in turn is generated by detector 80 and the circuitry thereafter. Therefore, if a write request is forced to wait, it will be preserved for as long as necessary.

Read/write signal node 188 is meanwhile enabling NOR gate 170 due to its low state. The low state at write latch output node 98 will be propagated through delay gate 166 after a predetermined delay. This low state will then appear at input 168 of NOR gate 170. The low state at input 168 in combination with the low state on input line 64 causes NOR gate 170 to output a high state to write clock node 196. The high state at node 196 will be inverted through gate 198 to a low state on line 68, which in turn will cause a high state on write/read output clock line 13.

In the meantime, the high state at write clock node 196 will be propagated after a predetermined delay back through delay gate 202 to the gate of reset transistor 206, resetting latch 92 to ground. Responsive to resetting latch 92, the read/write clock output 13 will go low and node 157 will go high, thereby concluding the write processing. The UPDN or read/write signal output line 11 stays high during the above operation to indicate a write request.

If a rising edge is detected on read input line 54, rising edge detectors 84 and 86 and read latch 104 operate in the same manner as rising edge detectors 82 and 80 and write latch 92 operate in response to a rising edge of a write request input on line 56. The rising edge at read request input line 54 will eventually result in a high state on read line 160. This effectively requests decision-maker 62 to do a read enable. However, if a write request signal is already in processing, node 157 will have been set low and will act to disable arbiter NAND gate 158 from propagating the read request signal. In this case, a high read request at node 160 cannot get the attention of read/write signal latch 144. Therefore, read latch 104 operates to latch the read request and waits until arbiter gate 158 is enabled.

Upon completion of the conflicting write command, node 157 will go high, thus enabling arbiter gate 158. Both high inputs of NAND gate 158 will generate a low state on output line 162, thereby latching a high state at latch node 146, a low state at latch node 150 and a high state at read/write signal node 188. A high state at node 188 disables NOR gate 170. Therefore, if there is a write request received at this moment, latch 92 is prevented from sending a stored write request to write clock node 196. Further, since the signal is not propagated through to node 196, the write latch 92 cannot be reset as long as the NOR gate is disabled through a high state at its input 64. The write request in effect has to wait until the read request has been completed.

A high at node 188 also enables NAND gate 180. Therefore, a low experienced at read latch output node 112 sets the up/down output line 11 low to indicate a read request. In the meantime, the low state at read clock node 210 is propagated and inverted back through inverter 216 after a predetermined delay, and becomes a high state on line 218. A high state on line 218 operates to reset read latch node 108 to ground. This completes the read processing and returns arbiter 52 back to its original status.

The connection between node 178 and up/down signal output NAND gate 182 is a speed-up path that pulls the UPDN output 11 high before read/write signal node 188 does. This prevents a long delay path through delay gate 132, inverter 136, descending edge detector 138 and latch 144.

The predetermined delays of delay gates 126, 202, 166, 136, 174, 132, 212 and 216 are adjusted to adjust the time relationship between inputs and outputs, between the clock output 13 and the UPDN output 11, and between consecutive clock outputs appearing at clock output 13.

The time boundary between awarding priority to a write request in view of a near-simultaneous read request, or vice versa, is established as follows. If a read request is received before a write request, write/read signal node 188 will disable write NOR gate 170 and will enable read NAND gate 180. As the write request becomes closer in time to the read request, the low pulse from arbiter gate 158 will weaken until read/write signal latch 144 will no longer "flip" to store a "read signal" state.

In summary, an arbiter for setting priority between received read requests and write request for use in a FIFO memory has been shown. The arbiter is also useful in other sequential memories, such as last-in, first-out (LIFO) or stack memories. The arbiter effectively stores write and read requests that appear at its inputs simultaneously or near-simultaneously, and assigns the priority between these requests. While one request is being carried out, the other is stored such that both may be correctly processed. In the illustrated embodiment, write/read clock and up/down pulses are generated to operate an up/down counter and a set of flag generators.

While an illustrated embodiment and its advantages have been described in the above detailed description, the invention is not limited thereto but only by the spirit and scope of the appended claims.

What is claimed is:

1. An arbiter for receiving read and write requests and processing said requests for application to a memory, comprising:
   a read latch for storing a read request signal;
   a write latch for storing a write request signal;
   a decision circuit for assigning priority to one of said read request signal and said write request signal, a first-to-arrive request signal being chosen to be a priority request signal;
   a last-to-arrive request signal chosen as a non-priority request signal;
   a generator for generating a first clock signal in response to said priority request signal; and
   a generator for subsequently generating a second clock signal in response to the non-priority request signal.

2. The arbiter in claim 1, and further comprising a write input of said decision circuit for receiving both an original write request signal and a stored write request signal; and
   an output of said write circuit for communicating said stored write request signal to said write input, such that said stored write request signal will be pending at said write input after said original write request signal no longer appears thereat.

3. The arbiter of claim 2, wherein said write input of said decision circuit comprises a NAND gate, said original write request signal comprising a low pulse appearing at a first input of said NAND gate;
   said stored write request signal stored as a low state, said write circuit output coupled to a second input of said NAND gate;
   a resetter for resetting said stored write signal to a reset state after said write request has been processed;
   a delay circuit coupled between said write circuit output and said NAND gate operable to delay the transmission of said reset state to the second input of said NAND gate, such that said reset state will not appear at the second input of said NAND gate until said write request has been processed.

4. The arbiter of claim 1, and further comprising a read input of said decision circuit for receiving both an original read request signal and a stored read request signal, an output of said read circuit for communicating said stored read request signal to said read input of said decision circuit, such that said stored read request signal will remain pending at said read input after said original read request signal no longer appears at said read input.

5. The arbiter of claim 1 and further comprising:
   a decision latch of said decision circuit for storing a read state or a write state;

a resetter for resetting said stored read request signal to a reset state subsequent to the processing of said read request signal; and a decision latch reset circuit coupled to said decision latch and to an output of said read latch, said decision latch reset circuit operable, after a predetermined delay, to erase a stored read state in said decision latch responsive to a reset state in said read circuit.

6. The arbiter of claim 5, wherein said read circuit stores said reset state as a low state, said decision latch reset circuit including a falling edge detector, said low state coupled to an input of said falling edge detector through an inverting circuit, said falling edge detector outputting a positive-going pulse responsive to receiving said inverted low state, an output of said falling edge detector coupled to a resetter of said decision latch for resetting a stored read state to ground.

7. The arbiter of claim 1, and further comprising a rising edge detector for receiving said read request, said rising edge detector outputting said read request signal to said read latch responsive to receiving a rising edge of a read request.

8. The arbiter of claim 7, and further comprising a second rising edge detector for receiving a rising edge of said read request, an output of said second rising edge detector coupled to a read input of said decision circuit, said second rising edge detector operable to output said read request signal to said read input responsive to receiving a rising edge of said read request.

9. The arbiter of claim 1, and further comprising a rising edge detector for receiving said write request, an output of said rising edge detector coupled to an input of said write latch and operable to transmit said write request signal to said write latch responsive to said rising edge detector receiving a rising edge of said write request.

10. The arbiter of claim 9, and further comprising a second rising edge detector for receiving said write request, an output of said second rising edge detector coupled to a write input of said decision circuit for transmitting said write request signal thereto responsive to said second rising edge detector receiving a rising edge of said write request.

11. An arbiter for receiving read and write requests and selectively processing said requests for application to a sequential memory unit, comprising:
a read circuit for storing a read request and operable to output a read signal responsive thereto;
a write circuit for storing a write request and operable to output a write signal responsive thereto;
a decision circuit for receiving said read request and said write request, said decision circuit including:
a read disabler for disabling said read circuit from outputting a read signal when said decision circuit receives a write request before a read request; and
a write disabler for disabling said write circuit from outputting a write signal when said decision circuit receives a read request before a write request;
said decision circuit operable, in the event of a read request and a write request being received closely or simultaneously in time, to first process a selected one of said read request and write request, and further operable to subsequently process the other of said read request and write request.

12. The arbiter of claim 11, wherein said read circuit further comprises a read latch for storing said read request and a read reset circuit for erasing said read request, said read reset circuit coupled to an output of said read circuit for outputting said read signal, said read reset circuit, after a predetermined delay, clearing said stored read request from said read latch responsive to said read signal.

13. The arbiter of claim 11, wherein said read disabler comprises a disabling gate for selectively decoupling said read latch from said read circuit output in response to the current processing of a write request signal.

14. The arbiter of claim 11, wherein said write circuit comprises a write latch for storing a write state and a write reset circuit for erasing said write state, an output of said write circuit for outputting said write signal, said write reset circuit coupled to said write circuit output;
said write reset circuit operable, after a predetermined delay, to erase said write state responsive to said write signal.

15. The arbiter of claim 14, wherein said write disabler comprises a disabling gate for selectively decoupling said write latch from said write circuit output in response to the current processing of a read request signal.

16. The arbiter of claim 11, wherein said decision circuit includes a decision latch for storing a write state or a read state, a write input of said decision circuit for receiving said write request and a read input for receiving said read request;
an arbiter gate of said decision circuit for receiving said write input and said read input, said arbiter gate preventing the transmission of a read request to said decision latch in response to first receiving a write request;
said decision latch storing said read state in response to said arbiter gate first receiving said read request;
a resetter for resetting said stored read state in said decision latch to said write state in response to the completion of processing a read request.

17. An arbiter for assigning the priority between a read request and a write request received thereby closely in time, comprising:
a read circuit for receiving a read request and operable to store a read state and to generate a read clock pulse responsive to storing said read state thereto;
a write circuit for receiving a write request and operable to store a write state and to generate a write clock pulse responsive to storing said write state;
a decision circuit for receiving said write request and said read request, said decision circuit including:
a read disabler for disabling the transmission of said read clock pulse when a write request is received before said read request;
a write disabler for disabling the transmission of said write clock pulse when a read request is received before said write request; and
a read/write signal generator for generating a read signal in response to a read request and for generating a write signal in response to a write request;
a read/write signal output of said arbiter coupled to said read/write signal generator for outputting a first value corresponding to a read operation or a second value corresponding to a write operation; and a clock output of said arbiter operable to generate a clock pulse responsive to either said read clock pulse or said write clock pulse.

18. The arbiter of claim 17, wherein said read/write signal is a bivalent signal varying between two states, an output of said read/write signal generator coupled to said read disabler and said write disabler, a first state of said read/write signal operable to disable the transmission of said read clock pulse, a second state of said read/write signal operable to disable the transmission of said write clock pulse.

19. The arbiter of claim 17, wherein said read/write signal output comprises a NAND gate with a first input thereof coupled to said read/write signal generator and a second input thereof coupled to an output of said read circuit;

the storage of a read state in said read circuit operable to enable said read/write signal output NAND gate to transmit said first value corresponding to a read operation.

20. A system for generating flags to indicate predetermined capacity states in a sequential memory, comprising:

a plurality of flag generators each for generating a flag corresponding to the occurrence of a predetermined capacity state in said sequential memory;

an up/down counter for counting the difference between write requests for writing data to said memory and read requests for reading data from said memory;

a decoder coupled to said up/down counter for receiving said difference therefrom, said decoder coupled to each of said flag generators and operable to decode each of a plurality of predetermined numerical values, said decoder outputting decoded signals corresponding to each of said predetermined numerical values to at least one of said flag generators;

an arbiter coupled to said up/down counter, said arbiter transmitting a read/write signal and a clock signal to said up/down counter in response to the receipt by said arbiter of a read request or a write request, a first value of said read/write signal generated responsive to a read request and a second value of said read/write signal generated responsive to a write request; and said arbiter operable to assign priority to a selected one of a read request and a write request that are received by said arbiter closely or simultaneously in time, said arbiter operable to generate a clock signal and a value of said read/write signal responsive to said selected one of said requests, said arbiter operable to store the remaining one of said requests until said selected one of said requests has been processed, said arbiter thereafter operable to generate another value of said read/write signal and a clock signal responsive to the remaining one of said requests.

* * * * *